United States Patent
Kleber

(10) Patent No.: US 7,938,310 B2
(45) Date of Patent: May 10, 2011

(54) FRICTION-WELDED ASSEMBLY WITH INTERLOCKING FEATURE AND METHOD FOR FORMING THE ASSEMBLY

(75) Inventor: Richard M. Kleber, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/716,551

(22) Filed: Mar. 3, 2010

(65) Prior Publication Data

US 2010/0159274 A1 Jun. 24, 2010

Related U.S. Application Data

(62) Division of application No. 12/145,650, filed on Jun. 25, 2008, now Pat. No. 7,726,542.

(51) Int. Cl.
| | |
|---|---|
| B23K 20/12 | (2006.01) |
| B29C 65/06 | (2006.01) |
| F16D 65/12 | (2006.01) |
| B32B 1/08 | (2006.01) |

(52) U.S. Cl. ............. 228/114.5; 156/73.5; 188/218 XL; 428/35.7; 428/36.9; 428/586

(58) Field of Classification Search ........................ None
See application file for complete search history.

(56) References Cited

U.S. PATENT DOCUMENTS

| | | | | |
|---|---|---|---|---|
| 3,144,710 A | * | 8/1964 | Camps-Campins et al. | 228/114.5 |
| 3,269,003 A | * | 8/1966 | Hollander et al. | 228/114.5 |
| 3,417,457 A | * | 12/1968 | Burke et al. | 228/114.5 |
| 4,817,852 A | * | 4/1989 | Hill | 228/114 |
| 4,832,769 A | * | 5/1989 | Shantz et al. | 156/73.5 |
| 4,944,977 A | * | 7/1990 | Shantz et al. | 428/36.92 |
| 5,154,340 A | * | 10/1992 | Peacock | 228/114.5 |
| 5,167,310 A | * | 12/1992 | Fischer et al. | 192/113.5 |
| 5,211,100 A | * | 5/1993 | Fuller et al. | 92/169.1 |
| 5,469,617 A | * | 11/1995 | Thomas et al. | 29/889.21 |
| 5,495,977 A | * | 3/1996 | Hildebrandt et al. | 228/112.1 |
| 5,549,236 A | * | 8/1996 | Reinhardt | 228/114.5 |
| 6,199,261 B1 | * | 3/2001 | Slais | 29/516 |
| 6,660,407 B1 | * | 12/2003 | Bender et al. | 428/615 |
| 6,767,071 B2 | * | 7/2004 | Cai | 301/132 |
| 2005/0274259 A1 | * | 12/2005 | Young et al. | 96/108 |
| 2006/0000875 A1 | * | 1/2006 | Kyriakoglou | 228/159 |

* cited by examiner

*Primary Examiner* — Kiley Stoner

(74) *Attorney, Agent, or Firm* — Quinn Law Group, PLLC

(57) ABSTRACT

A welded assembly includes a weld joint formed via a spin welding process. A disc receives a cylinder prior to spin welding, with the disc having a circumferential groove undercutting or defining an annular shelf. An interlocking feature retaining the cylinder and disc is formed between a flow pattern of the cylinder and the annular shelf upon cooling of molten flash in the groove underneath the annular shelf. Teeth can be formed integrally with the disc to provide a torsional interlocking feature between the disc and cylinder. A method for forming a weld joint between a plastic cylinder and disc includes providing the disc with a circumferential groove forming an annular shelf, and rotating the cylinder with respect to the disc under an axial force to thereby form an outflow of molten flash. The flash forms an interlocking feature when cooled after flowing into the groove underneath the shelf.

10 Claims, 2 Drawing Sheets

FRICTION-WELDED ASSEMBLY WITH INTERLOCKING FEATURE AND METHOD FOR FORMING THE ASSEMBLY

CROSS REFERENCE TO RELATED APPLICATIONS

This application is a divisional application of U.S. patent application Ser. No. 12/145,650 filed on Jun. 25, 2008, now U.S. Pat. No. 7,726,542, which is hereby incorporated by reference in its entirety.

TECHNICAL FIELD

The present invention relates to an optimized spin-welded assembly.

BACKGROUND OF THE INVENTION

In a friction welding process, such as a conventional spin welding process, the components to be welded are placed in close proximity to each other and rotated at high relative rates of speed in conjunction with an applied axial clamping force. Heat generated at or along an interface between the components melts a portion of the component material. The molten material that flows away from the interface or the weld zone is referred to as molten flash. When the molten flash cools, a homogenous welded joint is formed in the weld zone from the intermixed component materials.

Spin welding provides many advantages, e.g., relatively short cycle times, large batch sizes, and high overall process efficiency. Spin welding also provides excellent repeatability when used in conjunction with precise process control methods, such as controlled material feed and/or spin rates, axial pressures, applied stroke, etc. However, the bonding strength and long term durability of a welded joint formed via a conventional spin welding process may be less than optimal when used in certain applications, and therefore spin welding is generally restricted to welding relatively small cylindrical parts of similar materials, largely in order to maximize the strength of the resultant welded joint.

SUMMARY OF THE INVENTION

Accordingly, a welded assembly has a welded joint formed between adjacent components using a spin welding process as explained above. In addition to a conventional welded joint formed at or along the interface between adjacent components, the welded assembly has different interlocking features formed between the components via the spin welding process. The interlocking features retain the components in different directions independently of the welded joint, and are each formed by cooling molten flash during the spin welding process. In one embodiment, the components to be welded include a cylinder and a disc, which may be adapted for use as a brake rotor as set forth herein depending on the materials of construction.

As will be understood by those of ordinary skill in the art, when one component rotates with respect to another in the presence of an applied axial clamping force, one or both components melt within the weld zone. The present welded assembly uses the cooled molten flash or plastic outflow underneath an annular shelf of one of the components to form an axial interlocking feature. A torsional interlocking feature is also formed via the plastic outflow by envelopment of teeth of one of the components.

In particular, a welded assembly is provided that is formed via a spin welding process. The welded assembly includes a cylinder having a flow pattern formed by cooling a plastic outflow of the cylinder material during the spin welding process, and a disc having an opening for receiving the cylinder. The disc includes a circumferential groove defining an annular shelf, and a plurality of inwardly-projecting teeth each at least partially enveloped by the plastic outflow of the cylinder. The welded assembly includes a welded joint formed along an interface between the cylinder and the disc, with the flow pattern positioned at least partially within the circumferential groove and underneath the annular shelf. A first interlocking feature minimizes axial motion of the cylinder with respect to the disc. A second interlocking feature is formed between the teeth and the flow pattern, and minimizes torsion or relative rotation of the cylinder and the disc.

Another welded assembly is formed during a spin welding process, and includes a cylinder and a disc adapted for receiving the cylinder, wherein the disc includes a circumferential groove defining an annular shelf a plurality of inwardly-projecting teeth. A welded joint is formed between the cylinder and the disc, and includes a first interlocking feature that axially retains the cylinder and the disc via the circumferential groove independently of the welded joint, and a second interlocking feature that forms a torsional interlock using the inwardly-projecting teeth. The torsional interlock prevents a relative rotation between the cylinder and the disc. Each of the welded joint, the first interlocking feature, and the second interlocking feature is formed by cooling a molten outflow of molten flash during the spin welding process.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
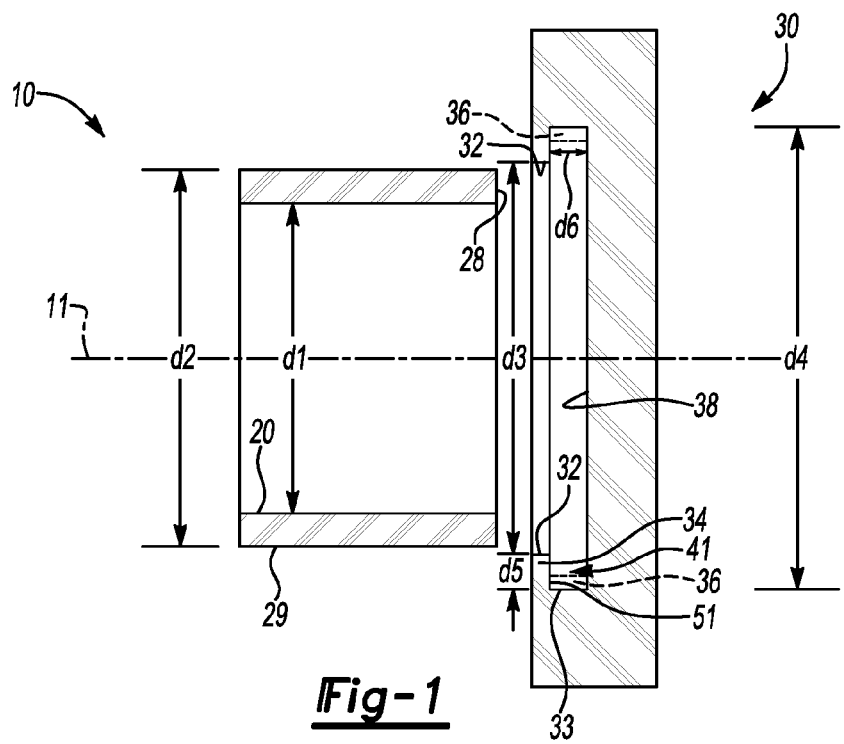
FIG. 1 is a cutaway side view of a representative pair of components prior to mutual bonding via a friction welding or a spin welding process.

Referring to the drawings wherein like reference numbers represent like components throughout the several figures, and beginning with FIG. 1, a first component 10 and a second component 30 are shown as they appear prior to being subjected to a spin welding process. The first component 10 is shown in one embodiment as a tube or a cylinder, and the second component 30 is shown as a disc. As such a configuration is most typically used during a conventional spin welding process, for simplicity the first and second components will be referred to respectively hereinafter as the cylinder 10 and the disc 30.

In one embodiment, the cylinder 10 and disc 30 each may be constructed of the same type or different types of a suitable metal, e.g., aluminum alloy, cast iron, etc. In another embodiment, the cylinder 10 and disc 30 each may be constructed of the same or different types of a thermoplastic polymer having a relatively high molecular weight, which becomes soft and ultimately molten and easily welded when a sufficient level of heat is applied. Those of ordinary skill in the art will recognize that other metal, plastic, and/or composite materials that respond in an acceptable manner to spin welding forces can also be used within the scope of the invention.

Cylinder 10 and disc 30 share a common axis of rotation 11. Cylinder 10 has an inner surface 20 defining an opening or diameter d1, an outer surface 29 having a diameter d2, and a weldable surface 28. Likewise, disc 30 has a floor 38, a first inner wall or surface 32 defining an opening having a diameter d3, and a second inner wall or surface 33 having a diameter d4. Diameter d3 of disc 30 is slightly larger than diameter d2 of cylinder 10 in order to allow the cylinder 10 to pass through diameter d3 of the disc 30 without touching the first inner surface 32.

A circumferential undercut, cavity, or groove 41 is provided within surface 32 of disc 30, with the groove 41 undercutting surface 32 by a radial distance d5 to form an annular shelf 34. The groove 41 has an axial distance d6, with the radial distance d5 being the distance as measured between the first inner surface 32 and the second inner surface 33. An optional plurality of splines or teeth 36 (also see FIG. 4) can extend in a radially-inward direction from the second inner surface 33 toward the first inner surface 32 within the groove 41, with a torsion interlocking capability of the teeth 36 described in more detail below with reference to FIGS. 3 and 4.

Figure 2:
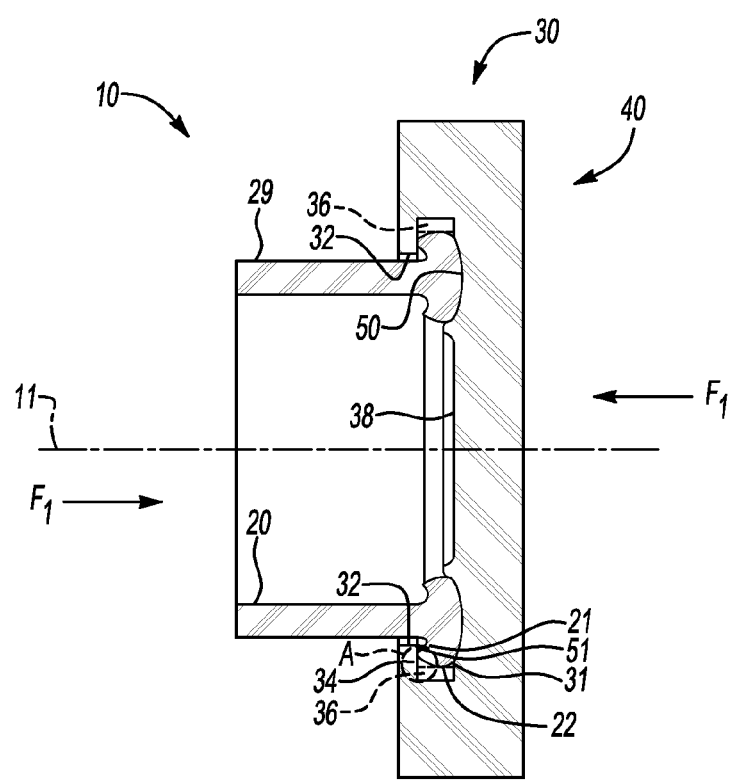
FIG. 2 is a cutaway side view of the components of FIG. 1 according to one embodiment.

Referring to FIG. 2, prior to commencement of the spin welding process the surface 28 (see FIG. 1) of cylinder 10 is moved into contact with the floor 38 of disc 30. A first axial force is then applied to the cylinder 10 and disc 30, as represented by the opposing arrows $F_1$, while one or both of the cylinder and the disc are rotated or spun at a relatively high rate of speed. That is, one of the cylinder 10 and disc 30 can be rotated while the other is held stationary. Alternately, the cylinder 10 can be rotated in one direction while disc 30 is rotated in the opposite direction to maximize a speed differential. The materials of construction of cylinder 10 and disc 30 melt along their interface to form a welded joint 50 upon cooling, thus producing a welded assembly 40.

When the localized temperature of the cylinder 10 and the disc 30, i.e., the temperature at or along the welded joint 50 being formed, approaches the melting point of the materials of construction of the cylinder and disc, the relative rotation of the cylinder and disc is abruptly stopped while the first axial force $F_1$ is maintained. The molten flash rapidly cools to form a singular or homogenous structure, as will be understood by those of ordinary skill in the art of spin-welding. However, prior to solidifying, the molten flash is moved or admitted into the groove 41 by its relatively low viscosity and the first axial force $F_1$, i.e., the molten flash flows underneath the annular shelf 34 as shown by the flow pattern 21 in FIG. 2.

Upon cooling, flow pattern 21 of the cylinder 10 and an adjoining plastic flow pattern 31 of the disc 30 result. In this manner, a first interlocking feature is formed, as represented generally by area A, between the flow pattern 21 of cylinder 10 and the annular shelf 34, thus retaining the cylinder with respect to the disc 30, and vice versa. That is, axial retention is provided by the first interlocking feature (area A) independently of the integrity, strength, or status of the welded joint 50. Should the welded joint 50 fail under an applied load to the assembly 40, cylinder 10 and disc 30 remain mutually connected in the axial direction via the first interlocking feature (area A). As the molten flash is also moved into contact with an underside or a lower surface 51 of the annular shelf 34, a secondary welded joint is effectively formed adjacent to the annular shelf 34 at or along the lower surface 51.

As shown in FIG. 2, flow pattern 21 has a first or initial outside surface 22 corresponding to an expected maximum diametric flow range under the axial force $F_1$. The position of the initial outside surface 22 can be selected and controlled to provide sufficient radial overlap with the annular shelf 34 to enable an interlocking relationship therewith. Shown in phantom are teeth 36 (also see FIG. 4) which are briefly described above. The torsional interlocking functionality provided by teeth 36 will now be described with reference to FIGS. 3 and 4.

Figure 3:
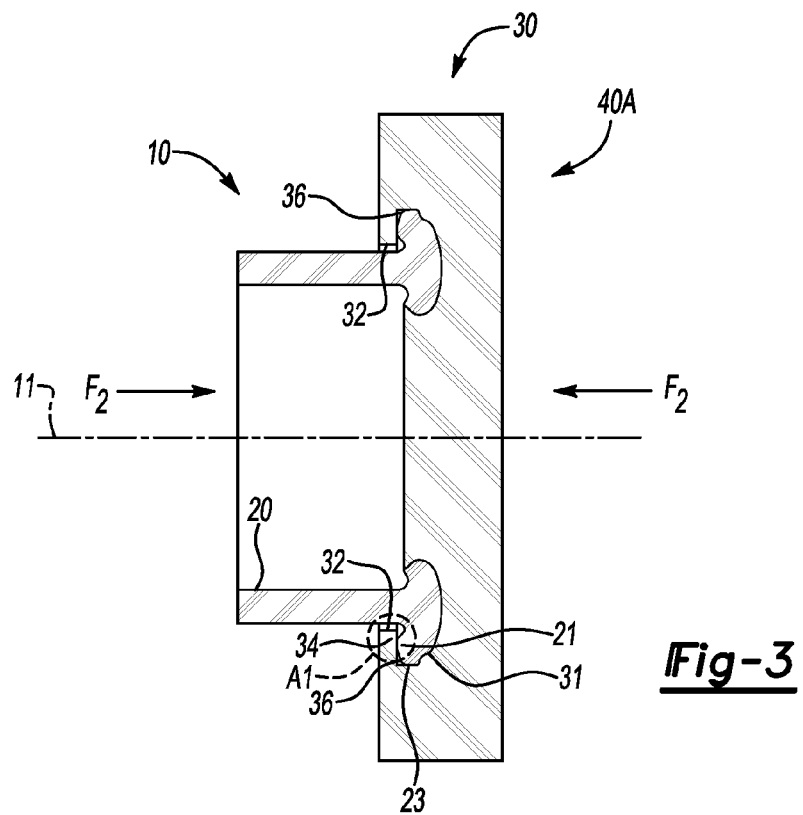
FIG. 3 is a cutaway side view of the components of FIG. 1 according to another embodiment.

Referring to FIG. 3, the assembly 40 of FIG. 2 is shown in another embodiment as the assembly 40A, shown as a representative brake rotor. In one embodiment, cylinder 10 is constructed of aluminum alloy, while the disc 30 is constructed of cast iron, although other materials or combinations of materials may also be used within the scope of the invention. The assembly 40A utilizes the teeth 36 and a secondary axial compressive force $F_2$ to provide a second interlocking feature, represented generally by the area A1, for minimizing or preventing relative rotation of the cylinder 10 with respect to the disc 30, and vice versa. As shown in FIG. 2, the crest of flow pattern 21 contacts lower surface 51 of the annular shelf 34, but its initial outside surface 22 has not quite contacted teeth 36.

In the assembly 40A of FIG. 3, at the instant relative rotation of the cylinder 10 and disc 30 is abruptly stopped, the first axial force $F_1$ of FIG. 2 is rapidly increased, thus resulting in the second axial force $F_2$. The second axial force $F_2$ causes additional plastic outflow or an increase in the diameter associated with the initial outside surface 22 to thereby produce a flow pattern 21 having a final outside surface 23 which is larger than the diameter of the initial outside surface 22. As a result, the teeth 36 are at least partially contacted by, and can be completely enveloped or engulfed by, the additional plastic outflow. By adjusting the level of second axial force $F_2$, the desired amount of envelopment or contact with the teeth 36 can be achieved. In this manner, a second interlocking feature (area A1) is formed between the flow pattern 21 and the teeth 36 to provide a torsional interlocking feature, thereby minimizing or preventing relative rotation between cylinder 10 and disc 30.

Figure 4:
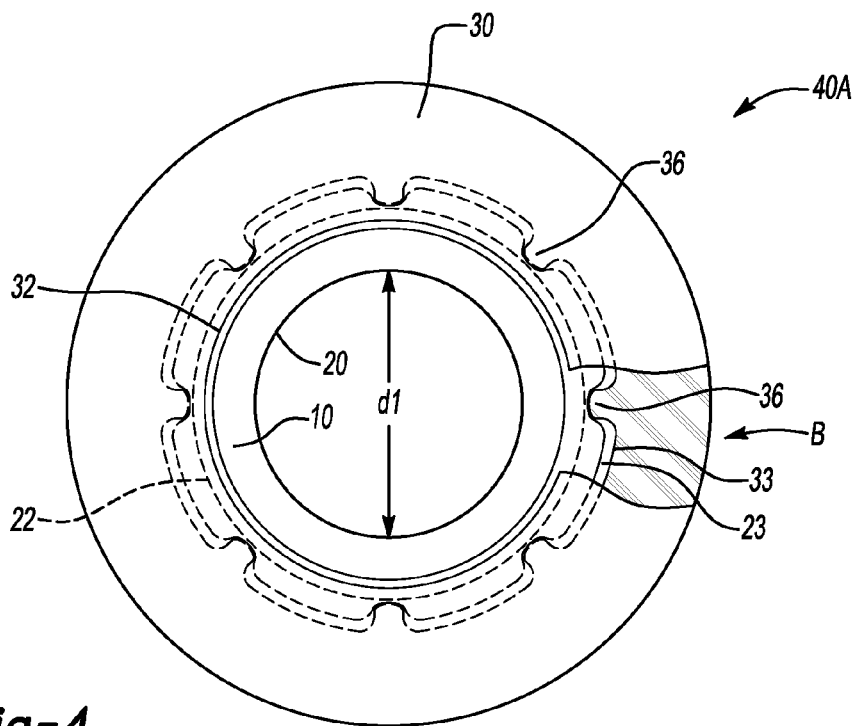
FIG. 4 is a plan view of the welded components of FIGS. 2 and 3.

Referring to FIG. 4, a top view of the assembly 40A of FIG. 3 is shown after the application of the second axial force $F_2$. A portion or section of the top-most layer of the disc 30 has been cut away just below the level of the annular shelf 34, as indicated generally by the arrow B, in order to reveal the spatial relationship between the teeth 36 and the final outside surface 23, or a representative amount of envelopment of the teeth 36 by the additional plastic outflow caused by the second axial force $F_2$. Also shown in the initial outside surface 22, which is used when the teeth 36 are not required or when the teeth 36 are not present in disc 30.

While the best modes for carrying out the invention have been described in detail, those familiar with the art to which this invention relates will recognize various alternative designs and embodiments for practicing the invention within the scope of the appended claims.

The invention claimed is:

1. A welded assembly formed via a spin welding process, the assembly comprising:
 a cylinder having a flow pattern formed by cooling a plastic outflow of a molten portion of the cylinder during the spin welding process;
 a disc having an opening for receiving the cylinder, a circumferential groove defining an annular shelf, and a plurality of teeth each at least partially enveloped by the plastic outflow of the cylinder; and a welded joint formed along an interface between the cylinder and the disc;

wherein the flow pattern is positioned at least partially within the circumferential groove and at least partially underneath the annular shelf to thereby form each of a first interlocking feature between the cylinder and the disc that minimizes an axial motion of the cylinder with respect to the disc, and a second interlocking feature between the plurality of teeth and the flow pattern that minimizes a relative rotation of the cylinder and the disc.

2. The welded assembly of claim 1, wherein the teeth are inwardly projecting and disposed entirely within the circumferential groove.

3. The welded assembly of claim 1, wherein the welded assembly is adapted for use as a brake rotor.

4. The welded assembly of claim 3, wherein the cylinder is constructed of aluminum alloy and the disc is constructed of cast iron.

5. The welded assembly of claim 1, wherein the cylinder is constructed of a first thermoplastic material, and wherein the disc is constructed of a second thermoplastic material.

6. A welded assembly formed during a spin welding process, the welded assembly comprising:

a cylinder;

a disc adapted for receiving the cylinder, wherein the disc includes a circumferential groove defining an annular shelf and a plurality of inwardly-projecting teeth;

a welded joint formed between the cylinder and the disc;

a first interlocking feature that axially retains the cylinder and the disc via the circumferential groove independently of the welded joint; and a second interlocking feature that forms a torsional interlock using the inwardly-projecting teeth, the torsional interlock preventing a relative rotation between the cylinder and the disc;

wherein each of the welded joint, the first interlocking feature, and the second interlocking feature are formed by a cooling of a molten outflow of molten flash during a spin welding process.

7. The spin-welded assembly of claim 6, wherein the second interlocking feature includes enveloping contact of the teeth by material of the cylinder.

8. The spin-welded assembly of claim 6, wherein the cylinder is constructed of aluminum alloy and the disc is constructed of cast iron.

9. The spin-welded assembly of claim 8, wherein the spin-welded assembly is configured as a brake rotor.

10. The spin-welded assembly of claim 6, wherein the cylinder and the disc are constructed of a thermoplastic material.

* * * * *